United States Patent [19]

Butler

[11] Patent Number: 5,040,725
[45] Date of Patent: Aug. 20, 1991

[54] ADAPTIVE CONTROLLER FOR FORCED HOT WATER HEATING SYSTEMS

[76] Inventor: Warren E. Butler, 2305 Morse Ave., Scotch Plains, N.J. 07076

[21] Appl. No.: 453,018

[22] Filed: Dec. 20, 1989

Related U.S. Application Data

[63] Continuation-in-part of Ser. No. 286,704, Dec. 20, 1988, abandoned.

[51] Int. Cl.$^5$ ............................................. F24D 3/00
[52] U.S. Cl. .................................. 237/8 R; 165/11.1; 236/94; 364/156
[58] Field of Search ................ 236/91 F, 91 R, 46 R, 236/91.6, 94; 237/8 R; 364/156; 219/279; 165/11.1

[56] References Cited

U.S. PATENT DOCUMENTS

| | | | |
|---|---|---|---|
| 4,417,131 | 11/1983 | Carl | 219/279 |
| 4,516,720 | 5/1985 | Chaplin | 236/91 F |
| 4,557,417 | 12/1985 | Ruby | 236/91 F |
| 4,593,176 | 6/1986 | Seefeldt | 219/279 |
| 4,757,944 | 7/1988 | Kagohata et al. | 236/91 F |
| 4,844,335 | 7/1989 | McKinley et al. | 237/8 R |

Primary Examiner—William E. Wayner

[57] ABSTRACT

An automatic control device which periodically computes system operating costs and utilizes those computed costs to adjust a forced hot-water heating system for maximum economy. Labor and material costs required to maintain, and replace at periodic intervals, the circulation pump and boiler, as well as the energy costs to operate those units, are calculated in an iterative manner over a plurality of predetermined time intervals. The successive results are used to control the water temperature setpoint for minimum system operating costs.

1 Claim, 2 Drawing Sheets

ADAPTIVE CONTROLLER FOR FORCED HOT WATER HEATING SYSTEMS

This is a continuation-in-part of Ser. No. 07/286,704 filed Dec. 20, 1988, now abandoned.

BACKGROUND OF THE INVENTION

1. Field of the Invention

This invention relates to a control device which automatically adjusts the boiler temperature in a forced hot-water heating system for improved economy.

2. Description of Prior Art

In forced hot-water systems used to heat buildings, both residential and commercial, the temperature of the water in the boiler is typically maintained by manually setting high-limit and low-limit controls, or a main temperature control in conjunction with a secondary adjustment which establishes the difference between the upper and lower temperatures. In some cases the users may make occasional changes in these adjustments on a seasonal basis but in most cases they remain fixed. In any event, the boiler temperature settings are seldom, if ever, changed often enough to preclude significant losses in heating system energy.

If the boiler temperature controls are set too high for the heating system's demands, radiation losses are increased and fuel is wasted. With settings too low, the system will not be able to maintain the temperatures set by the thermostats in the heated areas. Furthermore, the pumps used to circulate the heated water will be "on" excessively which adds to the overall costs in the form of increased energy usage. Also, maintenance costs are raised because the useful lives of the pumps are decreased.

The present invention computes, on a continuing basis, the operating costs of a forced hot-water heating system and uses those computed costs to automatically maintain control of the boiler temperatures at their optimum values to minimize overall heating system costs.

Some schemes to automatically set the temperature of boiler water of hot-water heating systems do not account for the costs of operating and maintaining the circulation pumps used in forced hot-water systems and therefore cannot minimize the overall costs of operating heating systems of this type.

SUMMARY OF THE INVENTION

The invention consists of a control device which automatically maintains the upper/lower temperatures of the boiler in forced hot-water heating systems at their optimum values so as to minimize heating system costs.

DESCRIPTION OF THE PREFERRED EMBODIMENT

Figure 1:
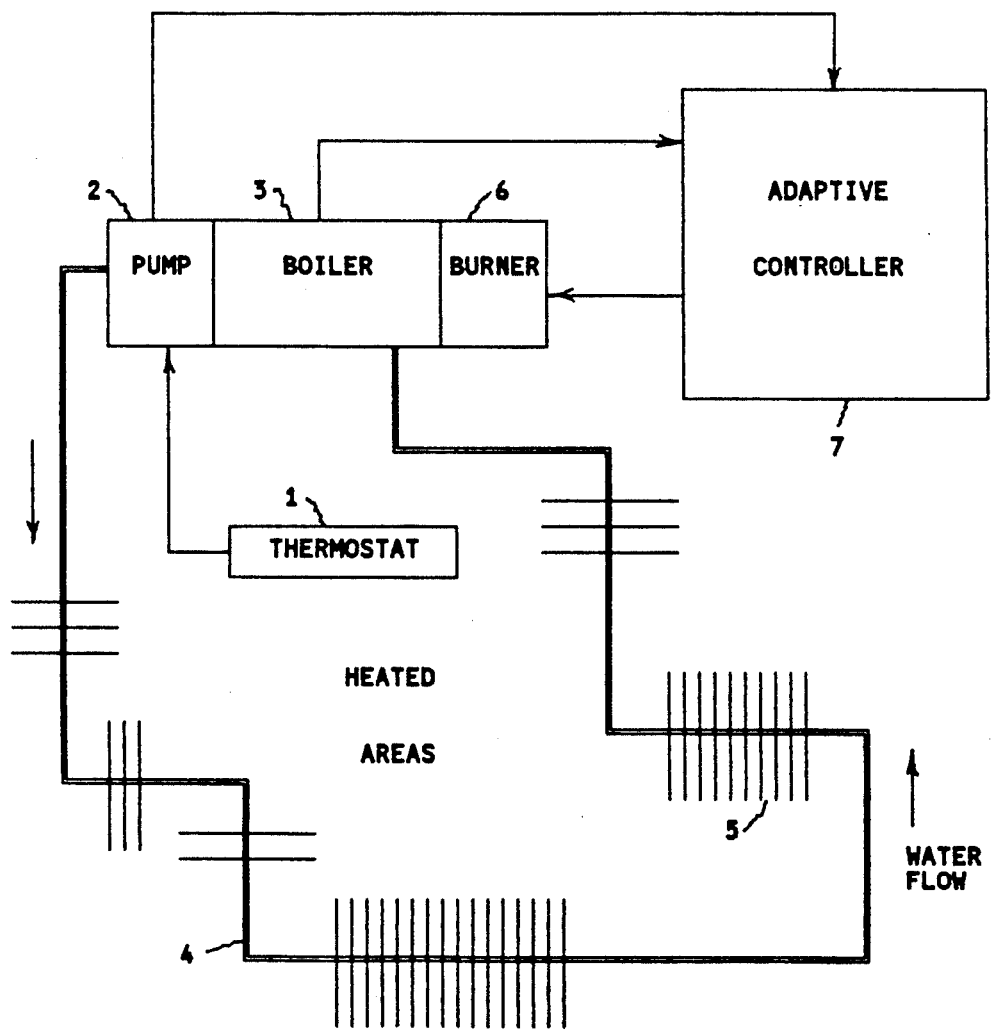
FIG. 1 shows the Adaptive Controller in conjunction with a simplified version of a forced-hot-water heating system.

FIG. 1 shows Adaptive Controller 7 interconnected to a simplified version of a forced-hot-water heating system. Thermostat 1 located in the space to be heated is set to the desired temperature. When the temperature in the area drops below the set value of thermostat 1, it actuates pump 2 which pumps hot water from boiler 3 through pipes 4 and radiators 5 in the heated spaces and back into boiler 3. The hot water flowing through radiators 5 raises the temperature of the heated areas. When this temperature reaches the value set by thermostat 1, pump 2 is turned off and the flow of hot water stops. Temperature in the heated area(s) is thus stabilized.

The energy utilized to heat radiators 5, and thus the heated areas, results in a drop in the temperature of the water in boiler 3. When it drops below a point established by Adaptive Controller 7, Adaptive Controller 7 turns burner 6 "on". Burner 6 remains "on" to heat the water until its temperature reaches the upper level established by Adaptive Controller 7. When the boiler temperature again drops below the lower limit, Adaptive Controller 7 senses this and turns burner 6 "on. The cycling continues automatically to maintain the boiler water temperature within the ranges set by Adaptive Controller 7. The computed overall energy costs over a period of time are used by Adaptive Controller 7 to automatically set the upper and lower temperature limits to their optimum values. The repetition rate of computing the energy costs, of setting the optimum upper/lower temperature limits and controlling burner 6 can be set over a wide range of milliseconds to hours, or longer.

Figure 2:
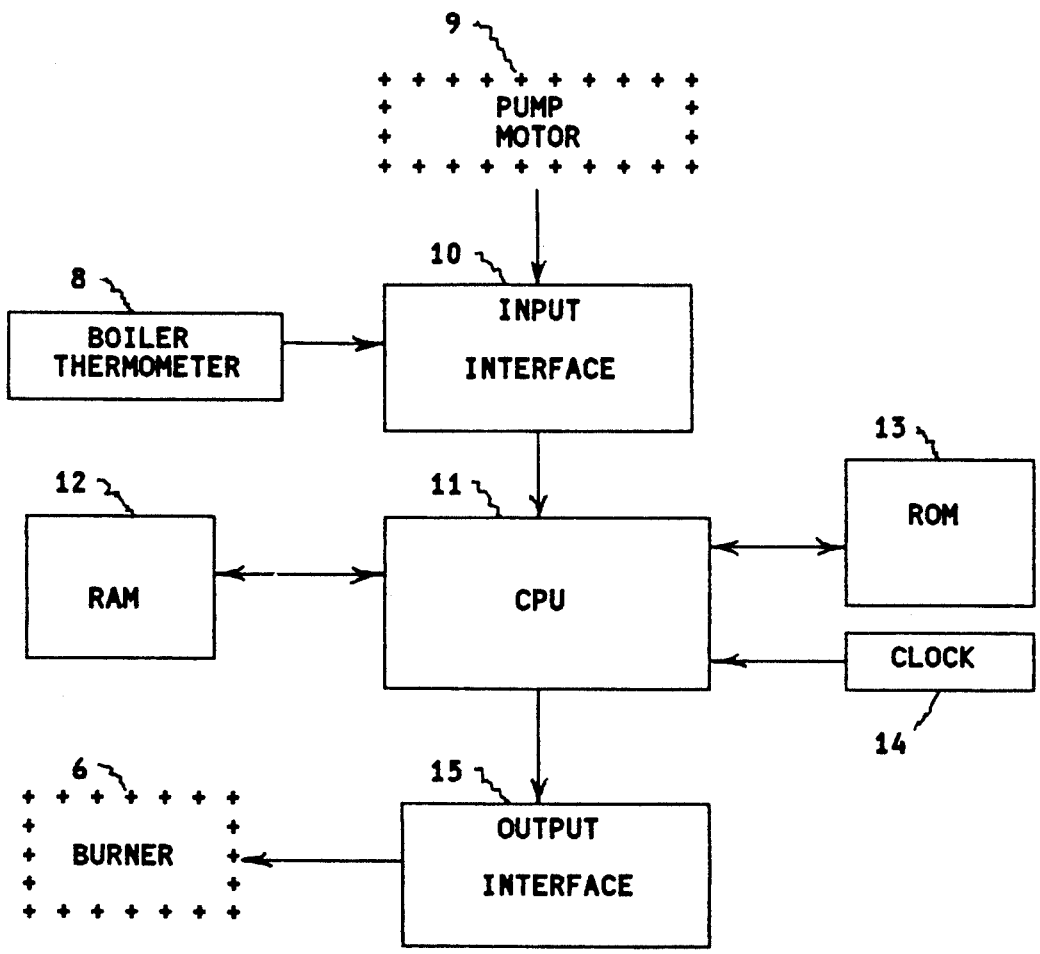
FIG. 2 is a block diagram of the Adaptive Controller in its preferred embodiment configuration.

FIG. 2 is a block diagram of the preferred embodiment of Adaptive Controller 7 of FIG. 1. It is composed of boiler thermometer 8, pump motor 9, input interface 10, CPU (Central Processing Unit) 11, RAM (Random Access Memory) 12, ROM (Read Only Memory) 13, clock 14 and output interface 15.

Burner 6 and pump motor 9 are not part of the Adaptive Controller 7 but are points of interconnection with a typical hot-water heating system and are shown to add clarity to the following explanation.

Electrical signals from boiler thermometer 8 and pump motor 9 are fed to input interface 10 and read into RAM memory 12 along with the time of occurrence. With clock 14 setting a stepping rate and establishing a time base, CPU 11 uses a program permanently stored in ROM 13 to sequentially perform the operations of Adaptive Controller 7.

Using the "on" times of the pump motor 9 and the burner 6 over a period of time and the operating/maintenance costs per unit of time for each, the overall heating system costs for that period of time are calculated employing data and algorithms stored in the microcomputer. For the succeeding computational period, the boiler temperatures are stepped in a given direction (up and down) and by a given amount as determined by the computer algorithms. At the end of that time interval, the costs are recomputed. If they have decreased, the process is repeated. If the costs have increased, the process is reversed, i.e., the boiler temperatures are stepped in the opposite direction. Using this interactive process with adjusted temperature steps, the optimum values for the upper and lower temperature settings for boiler 3 are determined.

These values are stored in separate locations of RAM 12 and then compared to the actual boiler temperature previously stored in its own position of RAM 12. If the temperature of the boiler is below the calculated optimum lower limit value, an "on" signal is fed to burner 6 via output interface 15. For proper operation of burner 6 in the forced hot-water heating system output interface 15 conditions the output signal. Typically, this means providing a relay closure or an AC or DC voltage for burner operation. Output interface 15 latches or holds this signal condition while Adaptive Controller 7 recycles and continuously repeats the above process. The repetition rate as controlled by clock 14 can be set to recycle the program from every few milliseconds to every few hours, or longer. Usually, it is of the order of every minute or so.

With burner 6 "on", it heats the water in boiler 3. The rise in temperature is reflected in the signal from boiler thermometer 8 which is used in successive calculations by CPU 11. When the boiler temperature reaches the calculated optimum upper limit, an "off" signal is fed to burner 6. Output interface 15 latches or holds this "off" signal until Adaptive Controller 7 detects the temperature of boiler 3 is below the lower limit value again. Adaptive Controller 7 continuously checks system conditions and automatically adjusts the water temperature for optimum operation. When the heating system conditions change, new upper and lower boiler temperatures are calculated by Adaptive Controller 7. So that the heating system is continually operating at the optimum boiler temperature range to provide maximum economy.

The above is the preferred embodiment but this invention encompasses any design configuration which provides the equivalent result.

The Adaptive Controller will use the "operating-/maintenance costs" as well as the "data and algorithms stored in the computer" referred to in paragraph 5 to control the heating system(s) so that the heated space will be maintained at the temperature setting of the thermostat while minimizing the overall heating system costs.

Overall heating system costs include:
(a) energy costs to heat the boiler fluid
(b) energy costs to operate the circulation pump
(c) labor and material costs to maintain and replace the boiler at periodic intervals
(d) labor and material costs to maintain and replace the circulation pump at periodic intervals Data on these costs will be stored in the computer memory and operated on by the algorithms, similarly stored in memory. The algorithms will be written to minimize overall heating system costs while insuring that the heated space is maintained at the desired temperature set point. Duty-cycles of the circulation pump and boiler burner will be computer from on-off times and incorporated in the algorithms. Also, a safe duty-factor limit to protect the circulation pump from overheating, as well as maximum and minimum boiler temperatures, will be part of the data stored in the computer and utilized within the algorithms.

The above is the preferred embodiment but this invention encompasses any design configuration which provides the equivalent results.

I claim:

1. In a hot water heating system having a hot water heater and a hot water pump for circulating the heated water to room heat exchangers for providing room heat wherein the pump and heater are actuated for varying on periods over predetermined time intervals for maintaining a water temperature setpoint and room temperature, the improvement comprising a control device for adjusting the setpoint temperature of the hot water, said system including means to calculate the cost of operating the pump and the heater over a preceding time interval and means to adjust said setpoint in an iterative manner so as to arrive at a minimum operating cost for the system over a plurality of time intervals.

* * * * *

UNITED STATES PATENT AND TRADEMARK OFFICE
CERTIFICATE OF CORRECTION

PATENT NO. : 5,040,725

DATED : August 20, 1991

INVENTOR(S) : Warren E. Butler

It is certified that error appears in the above-identified patent and that said Letters Patent is hereby corrected as shown below:

In column 3, lines 24, 25 and 26, please delete the paragraph.

In column 3, line 29, please change "paragraph 5" to --paragraph 6--.

In column 4, line 12, please change "computer" to --computed--.

Signed and Sealed this

Third Day of March, 1992

Attest:

HARRY F. MANBECK, JR.

*Attesting Officer*

*Commissioner of Patents and Trademarks*